United States Patent
Kumar et al.

(10) Patent No.: US 8,867,408 B2
(45) Date of Patent: Oct. 21, 2014

(54) FAST CONVERGENCE ON CHILD LINK FAILURES AND WEIGHTED LOAD BALANCING OF AGGREGATE ETHERNET/SONET BUNDLES

(75) Inventors: Nitin Kumar, Fremont, CA (US); Alex Baban, San Jose, CA (US); Alok Khambatkone, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 116 days.

(21) Appl. No.: 13/561,422

(22) Filed: Jul. 30, 2012

(65) Prior Publication Data
US 2012/0300674 A1 Nov. 29, 2012

Related U.S. Application Data

(63) Continuation of application No. 12/683,656, filed on Jan. 7, 2010, now Pat. No. 8,254,270.

(51) Int. Cl.
*H04L 1/00* (2006.01)
*H04J 1/16* (2006.01)
*G08C 15/00* (2006.01)
*G06F 11/00* (2006.01)
*G01R 31/08* (2006.01)

(52) U.S. Cl.
USPC .............. 370/255; 370/241; 370/400; 398/25

(58) Field of Classification Search
USPC .............. 370/241–255, 351–400; 398/25–45; 709/242–245
See application file for complete search history.

(56) References Cited

U.S. PATENT DOCUMENTS

| | | | |
|---|---|---|---|
| 6,847,645 B1 * | 1/2005 | Potter et al. | 370/392 |
| 7,190,696 B1 | 3/2007 | Manur et al. | |
| 7,333,501 B2 * | 2/2008 | Cook et al. | 370/401 |
| 7,539,131 B2 * | 5/2009 | Shen | 370/217 |
| 7,551,551 B2 | 6/2009 | Filsfils et al. | |
| 7,630,358 B1 * | 12/2009 | Lakhani et al. | 370/351 |
| 7,768,928 B2 * | 8/2010 | Harel et al. | 370/241.1 |
| 7,835,376 B2 | 11/2010 | Tanaka | |
| 7,898,959 B1 * | 3/2011 | Arad | 370/235 |
| 7,898,985 B1 * | 3/2011 | Ghosh et al. | 370/254 |
| 8,014,278 B1 * | 9/2011 | Subramanian et al. | 370/229 |
| 8,014,317 B1 | 9/2011 | Ghosh et al. | |
| 8,077,726 B1 * | 12/2011 | Kumar et al. | 370/395.31 |
| 8,184,540 B1 * | 5/2012 | Perla et al. | 370/235 |
| 2005/0018682 A1 * | 1/2005 | Ferguson et al. | 370/392 |
| 2010/0293408 A1 * | 11/2010 | Shannon et al. | 714/4 |
| 2011/0164872 A1 | 7/2011 | Kumar et al. | |

* cited by examiner

*Primary Examiner* — Man Phan
(74) *Attorney, Agent, or Firm* — Harrity & Harrity, LLP

(57) ABSTRACT

A network device provides a selector list that includes indices of child nexthops associated with the network device, where each of the child nexthops is associated with a corresponding child link provided in an aggregated bundle of child links. The network device also receives an indication of a failure of a child link in the aggregated bundle of child links, and removes, from the selector list, an index of a child nexthop associated with the failed child link. The network device further receives probabilities associated with the child links of the aggregated bundle of child links. Each of the probabilities indicates a probability of a packet exiting the network device on a child link. The network device also creates a distribution table based on the probabilities associated with the child links, and rearranges values provided in the distribution table.

20 Claims, 8 Drawing Sheets

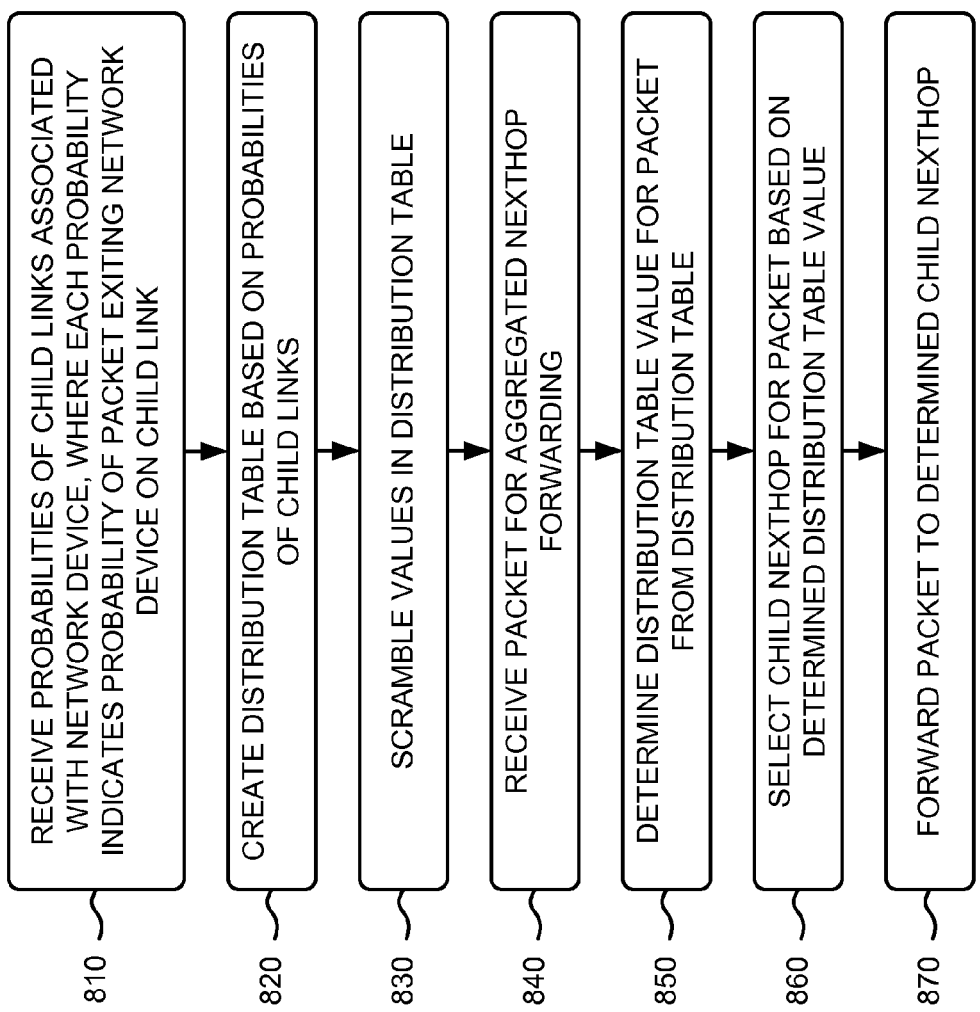

FAST CONVERGENCE ON CHILD LINK FAILURES AND WEIGHTED LOAD BALANCING OF AGGREGATE ETHERNET/SONET BUNDLES

RELATED APPLICATION

This application is a continuation of U.S. patent application Ser. No. 12/683,656, filed on Jan. 7, 2010 (now U.S. Pat. No. 8,254,270), the disclosure of which is hereby incorporated by reference herein.

BACKGROUND

Computing and communication networks typically include network devices, such as routers, firewalls, switches, or gateways, which transfer or switch data, such as packets, from one or more sources to one or more destinations. Network devices may operate on the packets as the packets traverse the network, such as by forwarding or filtering the packet-based network traffic.

In some network devices (e.g., routers), when a child link of an aggregate Ethernet (or synchronous optical networking (SONET) bundle fails, all child nexthops associated with the aggregate Ethernet/SONET bundle need to be re-programmed in a packet forwarding engine (PFE) data plane of the network device. This causes an inordinate amount of PFE data plane writes, which slows convergence of the network device and results in traffic loss.

Load balancing schemes may be implemented (e.g., via PFEs of a network device) for aggregate Ethernet/SONET bundles in order to evenly distribute packets across multiple links of the bundle. In some load balancing schemes, a probability of a packet leaving on a child link ($i_k$) may be represented as $p_k$, and the probabilities (e.g., $p_1, \ldots, p_k$) may be converted into weights on a scale of "1" to "65535." For example, the probabilities $p_1, p_2, p_3$, and $p_4$ are normalized to weights ($w_k$) such that $w_1+w_2+w_3+w_4=65535$. These weights are written along with the child nexthops that represent these child links. A packet hash is compared to each of these weights, and an index at which the packet hash exceeds the programmed weight is chosen to forward a packet. However, in such load balancing schemes, a number of memory reads needed to forward a packet will be proportional to a number of child links in an Ethernet/SONET bundle since the list of weights needs to be scanned to find an appropriate child link.

SUMMARY

According to one aspect, a method may be implemented by a network device. The method may include providing, by the network device, a selector list that includes indices of child nexthops associated with the network device, where each of the child nexthops is associated with a corresponding child link provided in an aggregated bundle of child links; receiving, by the network device, an indication of a failure of a child link in the aggregated bundle of child links; and removing, by the network device and from the selector list, an index of a child nexthop associated with the failed child link.

According to another aspect, a method may be implemented by a network device. The method may include receiving, by the network device, probabilities associated with child links of an aggregated bundle of child links associated with the network device, where each of the child links is associated with a corresponding child nexthop and where each of the probabilities indicates a probability of a packet exiting the network device on a child link; creating, by the network device, a distribution table based on the probabilities associated with the child links; and rearranging, by the network device, values provided in the distribution table.

According to still another aspect, a network device may include a memory to store a plurality of instructions, and a processor to execute instructions in the memory to generate a selector list that includes indices of child nexthops associated with the network device, where each of the child nexthops is associated with a corresponding child link provided in an aggregated bundle of child links associated with the network device. The processor may further execute instructions in the memory to receive an indication of a failure of a child link in the aggregated bundle of child links, and update the selector list to remove an index of a child nexthop associated with the failed child link.

According to a further aspect, a network device may include a memory to store a plurality of instructions, and a processor to execute instructions in the memory to receive probabilities associated with child links of an aggregated bundle of child links, where the aggregated bundle of child links is associated with the network device, each of the child links is associated with a corresponding child nexthop, and each of the probabilities indicates a probability of a packet exiting the network device on a child link. The processor may further execute instructions in the memory to provide a distribution table based on the probabilities of the child links, where the distribution table includes values generated by multiplying the probabilities by a number of entries provided in the distribution table, and rearrange the values provided in the distribution table.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 8 is a flow chart of an exemplary process for providing a weighted load balancing scheme for aggregate Ethernet/SONET bundles according to implementations described herein.

DETAILED DESCRIPTION

Figure 1:
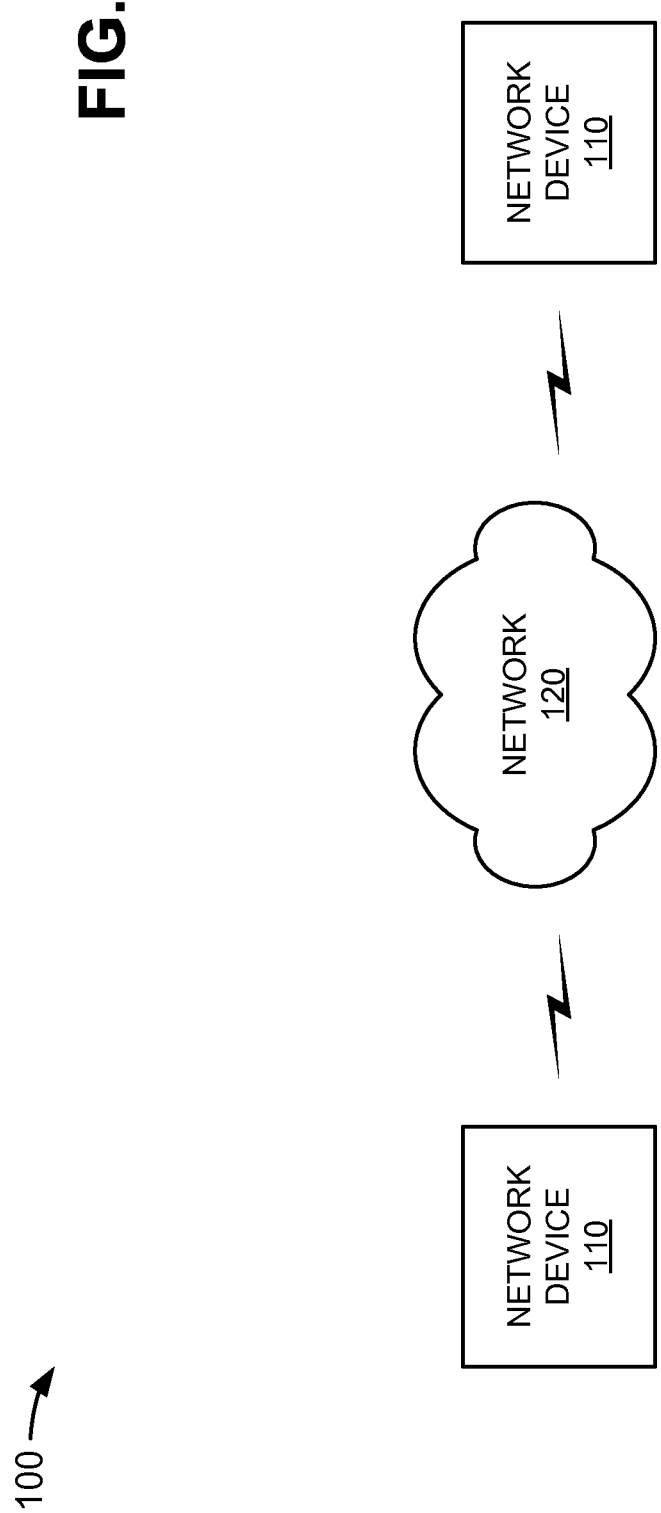
FIG. 1 is a diagram of an exemplary network in which systems and/or methods described herein may be implemented.

The following detailed description refers to the accompanying drawings. The same reference numbers in different drawings may identify the same or similar elements. Also, the following detailed description does not limit the invention.

Implementations described herein may provide systems and/or methods that may provide a selector list that includes indices of child nexthops of an aggregate Ethernet/SONET child link bundle associated with a network device. Aggregate nexthops associated with the network device may include a pointer to the selector list, which may act as an indirection. If a child link of the aggregate Ethernet/SONET bundle fails, the systems and/or methods may remove a child nexthop index associated with the failed child link from the selector list. Such an arrangement may result in a single operation that may be utilized immediately by all aggregate nexthops using the selector list. This may provide fast convergence of the network device during child link failures, regardless of a number of aggregate nexthops as well as a number of routes which use the aggregate nexthops. Furthermore, less traffic may be lost by customers using the aggregate nexthops, and traffic may be quickly load balanced to other available child links within the aggregate Ethernet/SONET bundle.

In an exemplary implementation, the systems and/or methods may provide a distribution table based on probabilities of a packet leaving on a child link of an aggregate Ethernet/SONET child link bundle, and may randomly rearrange entries (e.g., child nexthops) in the distribution table. The systems and/or methods may receive a packet, and may select a child nexthop for the packet from the distribution table. The systems and/or methods may determine a child link based on the selected child nexthop, and may forward the packet to the determined child link of the aggregate Ethernet/SONET child link bundle. Such an arrangement may load balance packets across multiple links with a configurable probability for selection of a link.

The terms "component" and "device," as used herein, are intended to be broadly construed to include hardware (e.g., a processor, a microprocessor, an application-specific integrated circuit (ASIC), field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

The term "packet," as used herein, is intended to be broadly construed to include a frame, a datagram, a packet, or a cell; a fragment of a frame, a fragment of a datagram, a fragment of a packet, or a fragment of a cell; or another type, arrangement, or packaging of data.

Furthermore, although aggregate Ethernet/SONET link bundles are described below, implementations described herein may be applied to other types of aggregate link bundles, such as equal-cost multi-path routing (ECMP) of resource reservation protocol (RSVP) tunnels.

Exemplary Network

FIG. 1 is a diagram of an exemplary network in which systems and/or methods described herein may be implemented. As illustrated, network 100 may include one or more network devices 110 interconnected by a network 120. Components of network 100 may interconnect via wired and/or wireless connections or links. Two network devices 110 and a single network 120 have been illustrated in FIG. 1 for simplicity. In practice, there may be more network devices 110 and/or networks 120. Also, in some instances, one or more of the components of network 100 may perform one or more tasks described as being performed by another one or more of the components of network 100.

Network device 110 may include a data transfer device, such as a gateway, a router, a switch, a firewall, a network interface card (NIC), a hub, a bridge, a proxy server, an optical add-drop multiplexer (OADM), or some other type of device that processes and/or transfers traffic. In an exemplary implementation, network device 110 may include a device that is capable of transmitting information to and/or receiving information from other network devices 110 via network 120.

Network 120 may include one or more networks of any type. For example, network 120 may include a local area network (LAN), a wide area network (WAN), a metropolitan area network (MAN), a telephone network (such as the Public Switched Telephone Network (PSTN), Public Land Mobile Network (PLMN), a wireless network), an intranet, the Internet, an optical fiber (or fiber optic)-based network, or a combination of networks.

Although FIG. 1 shows exemplary components of network 100, in other implementations, network 100 may contain fewer components, different components, differently arranged components, or additional components than depicted in FIG. 1.

Exemplary Network Device Configuration

Figure 2:
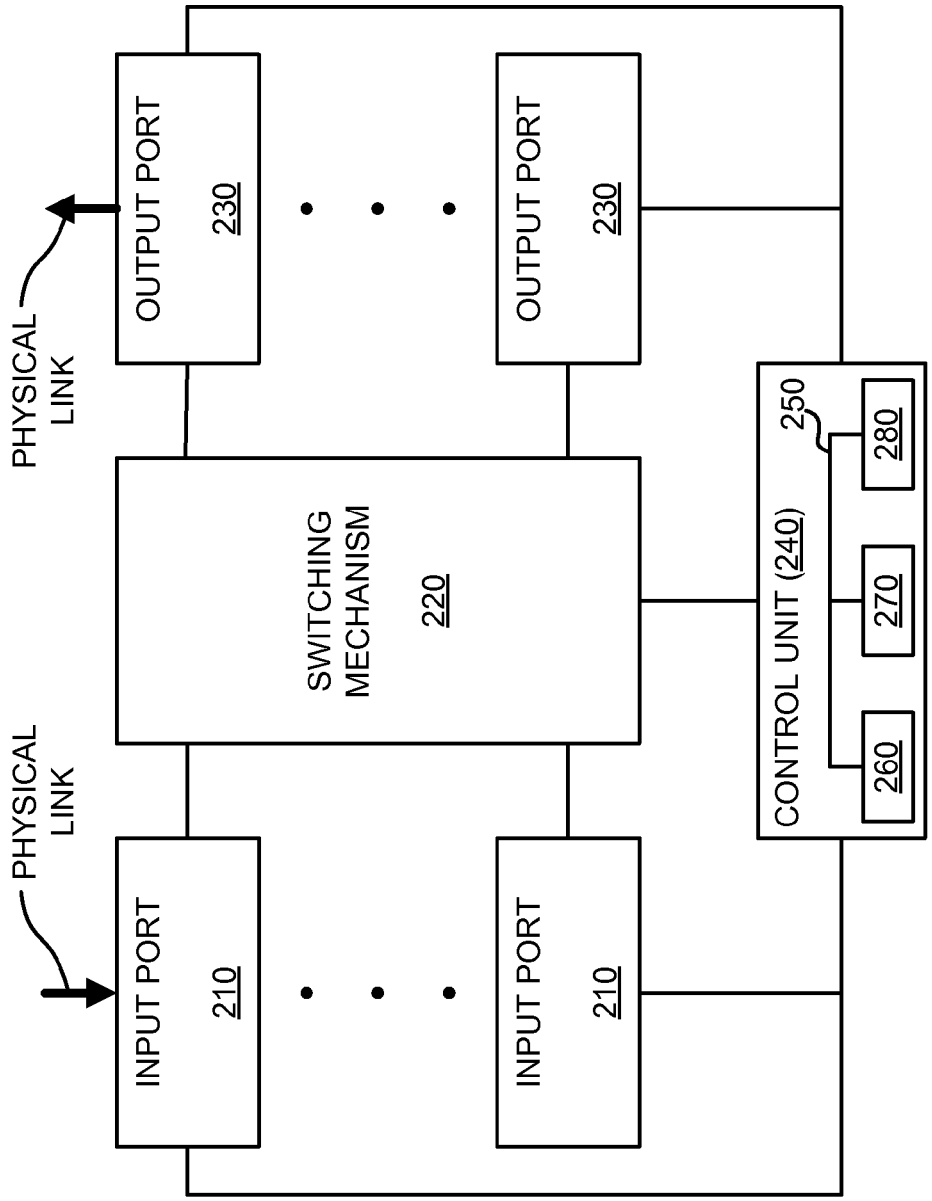
FIG. 2 is a diagram of exemplary components of a network device depicted in FIG. 1.

FIG. 2 illustrates a diagram of exemplary components of network device 110. As shown, network device 110 may include input ports 210, a switching mechanism 220, output ports 230, and a control unit 240.

Input ports 210 may be a point of attachment for a physical link and may be a point of entry for incoming traffic (e.g., packets). Input ports 210 may carry out data link layer encapsulation and decapsulation. Input ports 210 may look up a destination address of an incoming packet in a forwarding table to determine its destination port (i.e., route lookup). In exemplary implementations, input ports 210 may send (e.g., may be an exit point) and/or receive (e.g., may be an entry point) packets.

Switching mechanism 220 may interconnect input ports 210 with output ports 230. Switching mechanism 220 may be implemented using many different techniques. For example, switching mechanism 220 may be implemented via busses, crossbars, and/or shared memories.

Output ports 230 may store packets and may schedule packets for service on an output link (e.g., a physical link) Output ports 230 may include scheduling algorithms that support priorities and guarantees. Output ports 230 may support data link layer encapsulation and decapsulation, and/or a variety of higher-level protocols. In an exemplary implementations, output ports 230 may send packets (e.g., may be an exit point) and/or receive packets (e.g., may be an entry point).

Control unit 240 may use routing protocols and one or more forwarding tables for forwarding packets. Control unit 240 may interconnect with input ports 210, switching mechanism 220, and output ports 230. Control unit 240 may compute a forwarding table, implement routing protocols, and/or run software to configure and manage network device 110. Control unit 240 may handle any packet whose destination address may not be found in the forwarding table.

In an exemplary implementation, control unit 240 may include a bus 250 that may include a path that permits communication among a processor 260, a memory 270, and a communication interface 280. Processor 260 may include one or more processors, microprocessors, ASICs, FPGAs, or other types of processing units that may interpret and execute instructions. Memory 270 may include a RAM, a ROM device, a magnetic and/or optical recording medium and its corresponding drive, and/or another type of static and/or dynamic storage device that may store information and instructions for execution by processor 260. Communication interface 280 may include any transceiver-like mechanism that enables control unit 240 to communicate with other devices and/or systems.

Network device 110 may perform certain operations, as described in detail below. Network device 110 may perform these operations in response to processor 260 executing software instructions contained in a computer-readable medium, such as memory 270. A computer-readable medium may be defined as a physical or logical memory device. A logical memory device may include memory space within a single physical memory device or spread across multiple physical memory devices. The software instructions may be read into memory 270 from another computer-readable medium, such as a data storage device, or from another device via communication interface 280. The software instructions contained in memory 270 may cause processor 260 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows exemplary components of network device 110, in other implementations, network device 110 may contain fewer components, different components, differently arranged components, or additional components than depicted in FIG. 2. Alternatively, or additionally, one or more components of network device 110 may perform one or more other tasks described as being performed by one or more other components of network device 110.

Figure 3:
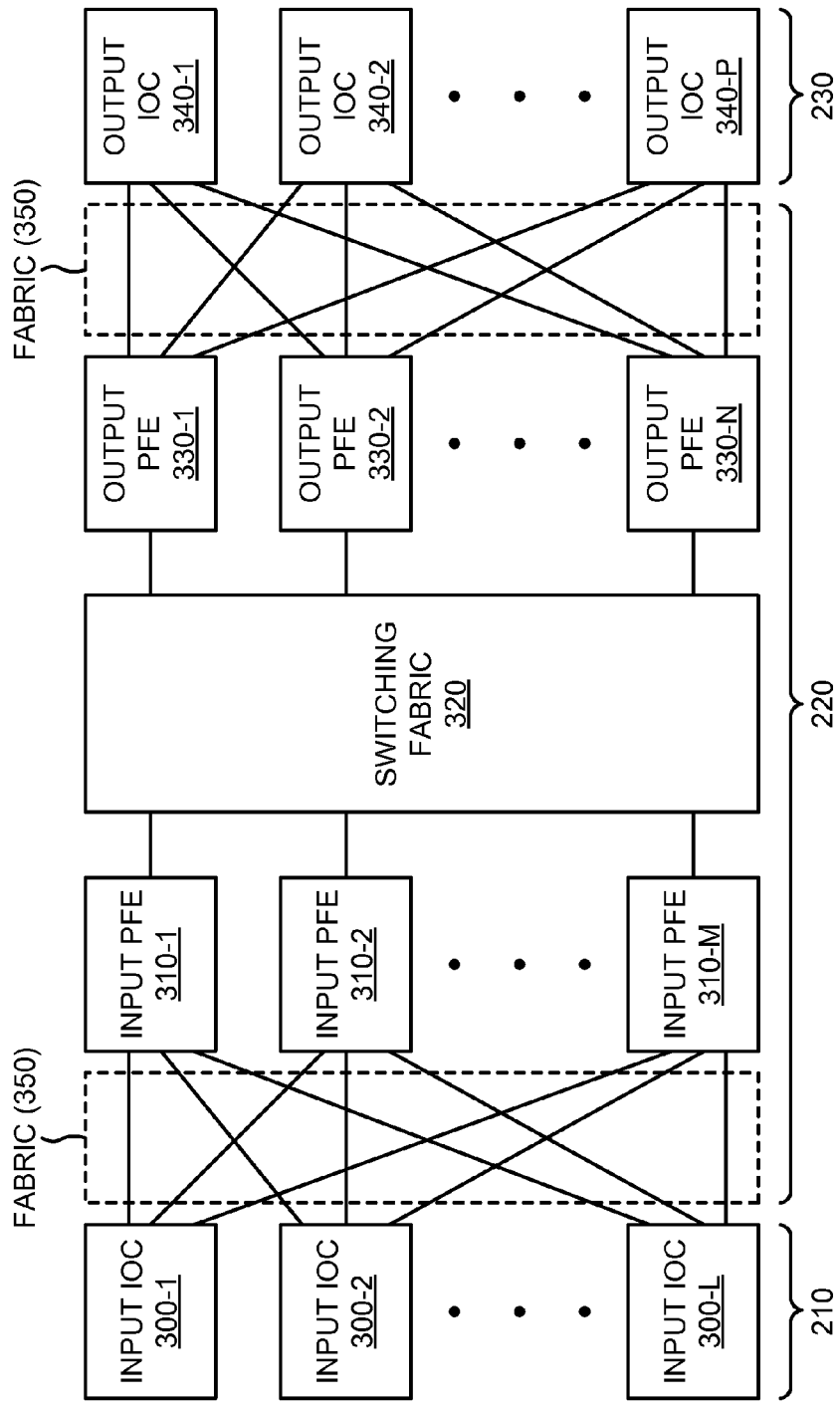
FIG. 3 is a diagram of additional exemplary components of the network device depicted in FIG. 1.

FIG. 3 is a diagram of additional exemplary components of network device 110. As illustrated, network device 110 may include a group of input IOCs 300-1 through 300-L (collectively referred to as "input IOCs 300" and, in some instances, singularly as "input IOC 300"); a group of input PFEs 310-1 through 310-M (collectively referred to as "input PFEs 310" and, in some instances, singularly as "input PFE 310"); a switching fabric 320, a group of output PFEs 330-1 through 330-N (collectively referred to as "output PFEs 330" and, in some instances, singularly as "output PFE 330"); a group of output IOCs 340-1 through 340-P (collectively referred to as "output IOCs 340" and, in some instances, singularly as "output IOC 340"); and fabrics 350. As further shown in FIG. 3, input IOCs 300 may correspond to input ports 210 (FIG. 2); input PFEs 310, output PFEs 330, and fabrics 350 may correspond to switching mechanism 220 (FIG. 2); and output IOCs 340 may correspond to output ports 230 (FIG. 2).

Input IOC 300 may include an input/output card that may be a point of attachment for a physical link and may be a point of entry for incoming packets to network device 110. As shown in FIG. 3, each of input IOCs 300 may interconnect with multiple input PFEs 310 (e.g., point-to-multipoint connections), via fabric 350. Input IOC 300 may include a variety of physical interfaces for receiving packets provided to network device 110. For example, input IOC 300 may include one or more Ethernet interfaces with small form-factor pluggable (SFP) connectors, one or more Ethernet interfaces with RJ-45 connectors, one or more Ethernet interfaces with XFP (e.g., 10 Gigabit SFP) connectors, and/or other interfaces.

Input PFE 310 may include a component that may process incoming packets (e.g., received from input IOC 300) prior to transmitting the packets to another PFE (e.g., output PFE 330). Input PFE 310 may also perform route lookup for packets, using forwarding tables, to determine destination information. If the destination information indicates that the packets should be sent to another PFE (e.g., output PFE 330) via switching fabric 320, then input PFE 310 may prepare the packets for transmission to the other PFE, if necessary, and may send the packets to the other PFE, via switching fabric 320.

Switching fabric 320 may include a switching component that may allow efficient communication between input PFEs 310 and output PFEs 330. For example, switching fabric 320 may include a hardwired non-blocking minimal spanning switch capable of connecting T inputs to T outputs in any combination.

Output PFE 330 may include a component that may process packets (e.g., received from input PFE 310 via switching fabric 320) prior to transmitting the packets to a network (e.g., network 120). Output PFE 330 may also perform route lookup for packets, using forwarding tables, to determine destination information. If the destination information indicates that the packets should be sent out on a physical interface (e.g., one of output IOCs 340) connected to output PFE 330, then output PFE 330 may prepare the packets for transmission by, for example, adding any necessary headers, and may transmit the packets to one of output IOCs 340.

Fabric 350 may include a switching component that may allow efficient communication between input IOCs 300 and input PFEs 310 and between output PFEs 330 and output IOCs 340. For example, fabric 350 may include a hardwired non-blocking minimal spanning switch capable of connecting S inputs to S outputs in any combination.

Although FIG. 3 shows exemplary components of network device 110, in other implementations, network device 110 may contain fewer components, different components, differently arranged components, or additional components than depicted in FIG. 3. Alternatively, or additionally, one or more components of network device 110 may perform one or more other tasks described as being performed by one or more other components of network device 110.

Exemplary Packet Forwarding Engine (PFE) Configurations

Figure 4:
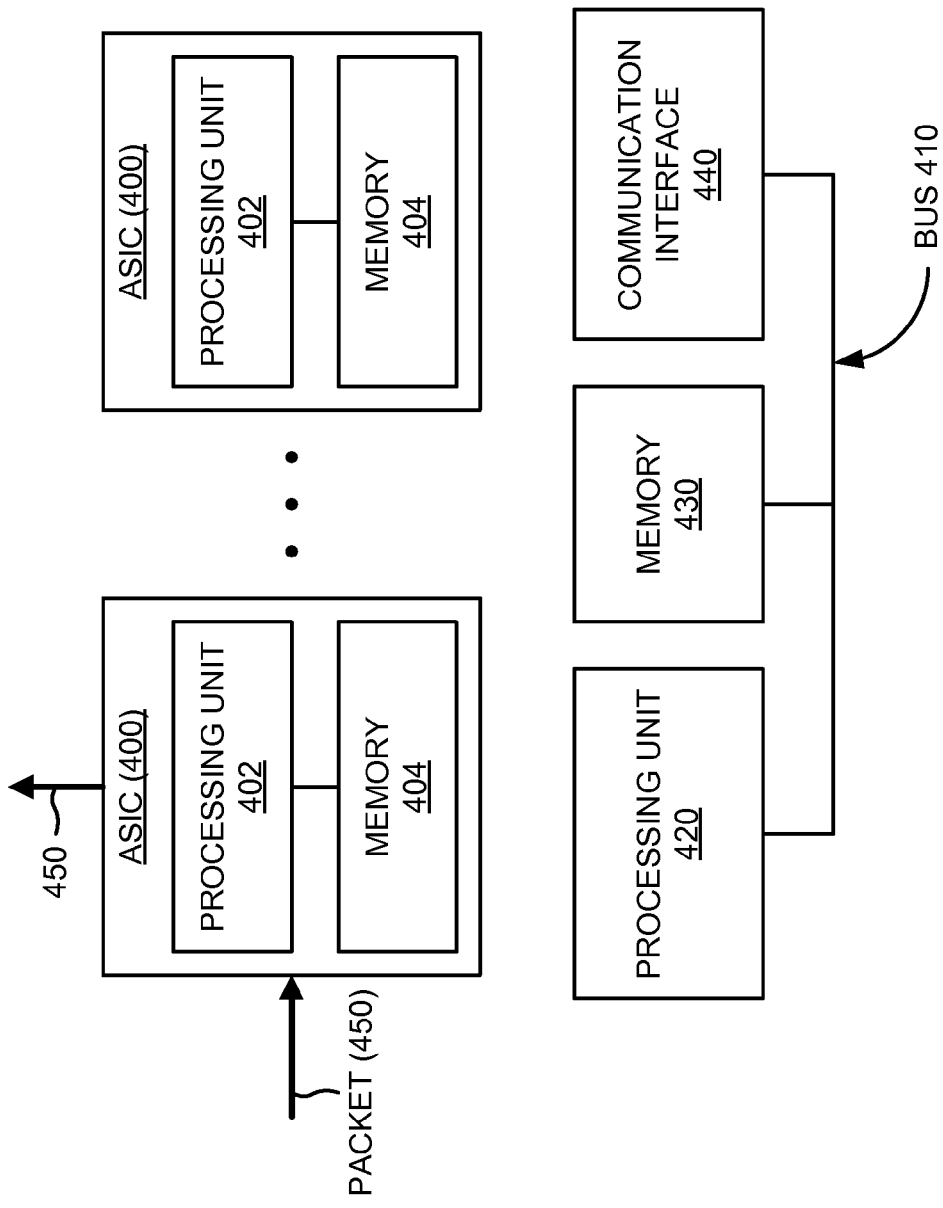
FIG. 4 is a diagram of exemplary components of a packet forwarding engine (PFE) depicted in FIG. 3.

FIG. 4 is a diagram of exemplary components of one of input PFEs 310 or one of output PFEs 330 (hereinafter referred to as "PFE 310/330"). As shown, PFE 310/330 may include one or more ASICs 400, a bus 410, a processing unit 420, a memory 430, and a communication interface 440. Components of PFE 310/330 may interconnect with each other via wired and/or wireless connections.

ASIC 400 may include an integrated circuit customized for a particular use, rather than intended for a general-purpose use. For example, ASIC 400 may include a chip designed to execute one or more operations of a component (e.g., PFE 310/330) provided in network device 110. As shown in FIG. 4, ASIC 400 may include a processing unit 402 interconnected with a memory 404. Processing unit 402 may include one or more processors, microprocessors, or other types of processing units that may interpret and execute instructions. Memory 404 may include a RAM, a ROM device, and/or another type of static and/or dynamic storage device that may store information and instructions for execution by processing unit 402.

As described herein, ASIC 400 may perform certain operations in response to processing unit 402 executing software instructions contained in a computer-readable medium, such as memory 404. The software instructions may be read into memory 404 from another computer-readable medium or from another device. The software instructions contained in memory 404 may cause processing unit 402 to perform processes described herein. Alternatively, hardwired circuitry may be used in place of or in combination with software instructions to implement processes described herein. Thus, implementations described herein are not limited to any specific combination of hardware circuitry and software.

Bus 410 may permit communication among processing unit 420, memory 430, and communication interface 440. Processing unit 420 may include one or more processors or microprocessors that interpret and execute instructions.

Memory 430 may include a RAM or another type of dynamic storage device that stores information and instructions for execution by processing unit 420; a ROM or another type of static storage device that stores static information and instructions for the processing unit 420; and/or some other type of magnetic or optical recording medium and its corresponding drive for storing information and/or instructions.

Communication interface 440 may include a mechanism that enables PFE 310/330 to communicate with other components, devices, and/or systems.

As described herein, PFE 310/330 may perform certain operations in response to processing unit 420 executing software instructions contained in a computer-readable medium, such as memory 430. The software instructions may be read into memory 430 from another computer-readable medium or from another device via communication interface 440. The software instructions contained in memory 430 may cause processing unit 420 to perform processes described herein. Alternatively, hardwired circuitry may be used in place of or in combination with software instructions to implement processes described herein. Thus, implementations described herein are not limited to any specific combination of hardware circuitry and software.

As further shown in FIG. 4, a packet 450 may be provided to ASIC 400. ASIC 400 may process packet 450, as described below in connection with FIGS. 5 and/or 6, and may forward packet 450 on to a destination (e.g., to a child link of an aggregate Ethernet/SONET bundle) determined by such processing.

Although FIG. 4 shows exemplary components of PFE 310/330, in other implementations, PFE 310/330 may contain fewer components, different components, differently arranged components, or additional components than depicted in FIG. 4. Alternatively, or additionally, one or more components of PFE 310/330 may perform one or more other tasks described as being performed by one or more other components of PFE 310/330.

Figure 5:
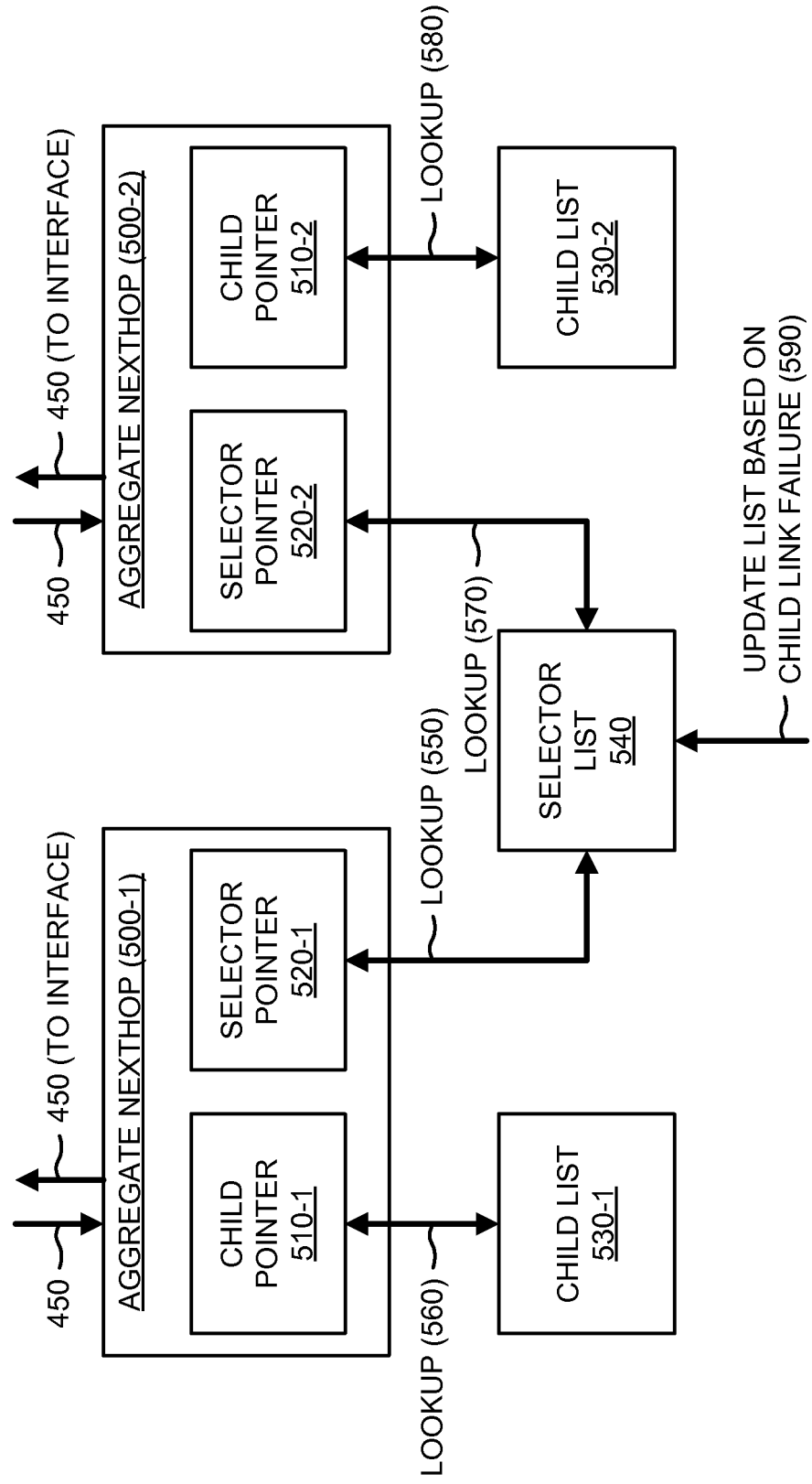
FIG. 5 is a diagram of exemplary functional components of an application-specific integrated circuit (ASIC) depicted in FIG. 4.

FIG. 5 is a diagram of exemplary functional components of ASIC 400. As shown, ASIC 400 may include aggregate nexthops 500-1 and 500-2; child pointers 510-1 and 510-2 (e.g., associated with aggregate nexthops 500-1 and 500-2, respectively); selector pointers 520-1 and 520-2 (e.g., associated with aggregate nexthops 500-1 and 500-2, respectively); child lists 530-1 and 530-2; and a selector list 540. In an exemplary implementation, the functionality described in connection with FIG. 5 may be provided by one or more of the components of ASIC 400 (FIG. 4). Although FIG. 5 shows two aggregate nexthops 500-1 and 500-2, ASIC 400 may include more than two aggregate nexthops, such as hundreds, thousands, etc. of aggregate nexthops.

Aggregate nexthop 500-1 may include address information for child nexthops (e.g., another network device in a network) associated with child links (e.g., of an aggregate Ethernet/SONET bundle) that a packet may traverse. As shown in FIG. 5, aggregate nexthop 500-1 may include child pointer 510-1 and selector pointer 520-1. Child pointer 510-1 may point to child list 530-1, and may enable aggregate nexthop 500-1 to retrieve information contained in child list 530-1. Selector pointer 520-1 may point to selector list 540, and may enable aggregate nexthop 500-1 to retrieve information contained in selector list 540.

Aggregate nexthop 500-2 may include address information for child nexthops associated with child links (e.g., of an aggregate Ethernet/SONET bundle) that a packet may traverse. As shown in FIG. 5, aggregate nexthop 500-2 may include child pointer 510-2 and selector pointer 520-2. Child pointer 510-2 may point to child list 530-2, and may enable aggregate nexthop 500-2 to retrieve information contained in child list 530-2. Selector pointer 520-2 may point to selector list 540, and may enable aggregate nexthop 500-2 to retrieve information contained in selector list 540.

Child list 530-1 may include a list of child nexthops associated with child links (e.g., of an aggregate Ethernet/SONET bundle) that a packet may traverse (e.g., via aggregate nexthop 500-1). The list of child nexthops provided in child list 530-1 may include information associated with the child nexthops, such as whether a child nexthop is a unicast nexthop or a multicast nexthop, information identifying a child link (e.g., an interface) associated with the child nexthop, etc.

Child list 530-2 may include a list of child nexthops associated with child links (e.g., of an aggregate Ethernet/SONET bundle) that a packet may traverse (e.g., via aggregate nexthop 500-2). The list of child nexthops provided in child list 530-2 may include information associated with the child nexthops, such as whether a child nexthop is a unicast nexthop or a multicast nexthop, information identifying a child link (e.g., an interface) associated with the child nexthop, etc.

Selector list 540 may include a table of indices of child nexthops associated with child links (e.g., of an aggregate Ethernet/SONET bundle) that a packet may traverse (e.g., via aggregate nexthop 500-1, aggregate nexthop 500-2, or other aggregate nexthops associated with ASIC 400). In an exemplary implementation, selector list 540 may include a table of up to two-hundred and fifty-six (256) entries that may be randomly arranged. For example, selector list 540 may include indices "0" and "1," which may indicate that child nexthops "0" and "1" are active. In such an example, selector list 540 may look like (0, 1, 0, 0, 0, 1, 1, 0, 0, 1, 0, 1, 1, 1, 0, 0, 1, . . . 1), and may contain approximately an equal number of "0s" and "1s" (e.g., since both child nexthops "0" and "1" may be equally preferred or balanced).

In an exemplary operation provided below, it may be assumed that child list 530-1 includes child nexthops U1 and U2 and information associated child nexthops U1 and U2, and that child list 530-2 includes child nexthops U3 and U4 and information associated with child nexthops U3 and U4. It may further be assumed that child nexthops U1 and U3 are unicast nexthops provided on a first child link (e.g., a first interface of network device 110), and that child nexthops U2 and U4 are unicast nexthops provided on a second child link (e.g., a second interface of network device 110). As described above, selector list 540 may look like (0, 1, 0, 0, 0, 1, 1, 0, 0, 1, 0, 1, 1, 1, 0, 0, 1, . . . 1), and may contain approximately an equal number of "0s" and "1s."

If packet 450 is provided to aggregate nexthop 500-1, selector pointer 520-1 of aggregate nexthop 500-1 may perform a lookup 550 of selector list 540. If selector pointer 520-1 retrieves a "0" from selector list 540 based on lookup 550, child pointer 510-1 may perform a lookup 560 (e.g., based on the results of lookup 550) of child list 530-1, and may retrieve child nexthop U1 (e.g., the first interface) from child list 530-1 based on lookup 560. Aggregate nexthop 500-1 may then send packet 450 via child nexthop U1 (e.g., the first interface). If selector pointer 520-1 retrieves a "1" from selector list 540 based on lookup 550, child pointer 510-1 may perform lookup 560 (e.g., based on the results of lookup 550) of child list 530-1, and may retrieve child nexthop U2 (e.g., the second interface) from child list 530-1 based on lookup 560. Aggregate nexthop 500-1 may then send packet 450 via child nexthop U2 (e.g., the second interface).

If packet 450 is provided to aggregate nexthop 500-2, selector pointer 520-2 of aggregate nexthop 500-2 may perform a lookup 570 of selector list 540. If selector pointer 520-2 retrieves a "0" from selector list 540 based on lookup 570, child pointer 510-2 may perform a lookup 580 (e.g., based on the results of lookup 570) of child list 530-2, and may retrieve child nexthop U3 (e.g., the first interface) from child list 530-2 based on lookup 580. Aggregate nexthop 500-2 may then send packet 450 via child nexthop U3 (e.g., the first interface). If selector pointer 520-2 retrieves a "1" from selector list 540 based on lookup 570, child pointer 510-2 may perform lookup 580 (e.g., based on the results of lookup 570) of child list 530-2, and may retrieve child nexthop U4 (e.g., the second interface) from child list 530-2 based on lookup 580. Aggregate nexthop 500-2 may then send packet 450 via child nexthop U4 (e.g., the second interface).

As further shown in FIG. 5, if a child link of an aggregate Ethernet/SONET bundle fails, selector list 540 may receive an update 590 based on the child link failure. Update 590 may remove the index of the child nexthop associated with the failed child link from selector list 540. This may result in a single operation (e.g., update 590) that may be utilized immediately by all aggregate nexthops (e.g., aggregate nexthops 500-1 and 500-2) using selector list 540. This may provide fast convergence of network device 110 during child link failures, regardless of a number of aggregate nexthops as well as a number of routes which use the aggregate nexthops. Furthermore, less traffic may be lost by customers using the aggregate nexthops, and traffic may be quickly load balanced to other available child links within the aggregate Ethernet/SONET bundle.

Returning the exemplary operation described above, if the first interface goes down due to link failure, update 590 may remove the index (e.g., "0") of the child nexthop associated with the failed first interface from selector list 540. In such an event, selector list 540 may look like (1, 1, 1, 1, . . . , 1). Therefore, if packet 450 is provided to aggregate nexthop 500-1, selector pointer 520-1 of aggregate nexthop 500-1 may perform lookup 550 of selector list 540, and may retrieve a "1" from selector list 540 based on lookup 550. Child pointer 510-1 may perform lookup 560 (e.g., based on the results of lookup 550) of child list 530-1, and may retrieve child nexthop U2 (e.g., the second interface) from child list 530-1 based on lookup 560. Aggregate nexthop 500-1 may then send packet 450 via child nexthop U2 (e.g., the second interface).

Furthermore, if packet 450 is provided to aggregate nexthop 500-2, selector pointer 520-2 of aggregate nexthop 500-2 may perform lookup 570 of selector list 540, and may retrieve a "1" from selector list 540 based on lookup 570. Child pointer 510-2 may perform lookup 580 (e.g., based on the results of lookup 570) of child list 530-2, and may retrieve child nexthop U4 (e.g., the second interface) from child list 530-2 based on lookup 580. Aggregate nexthop 500-2 may then send packet 450 via child nexthop U4 (e.g., the second interface).

Although FIG. 5 shows exemplary functional components of ASIC 400, in other implementations, ASIC 400 may contain fewer functional components, different functional components, differently arranged functional components, or additional functional components than depicted in FIG. 5. Alternatively, or additionally, one or more functional components of ASIC 400 may perform one or more other tasks described as being performed by one or more other functional components of ASIC 400.

Figure 6:
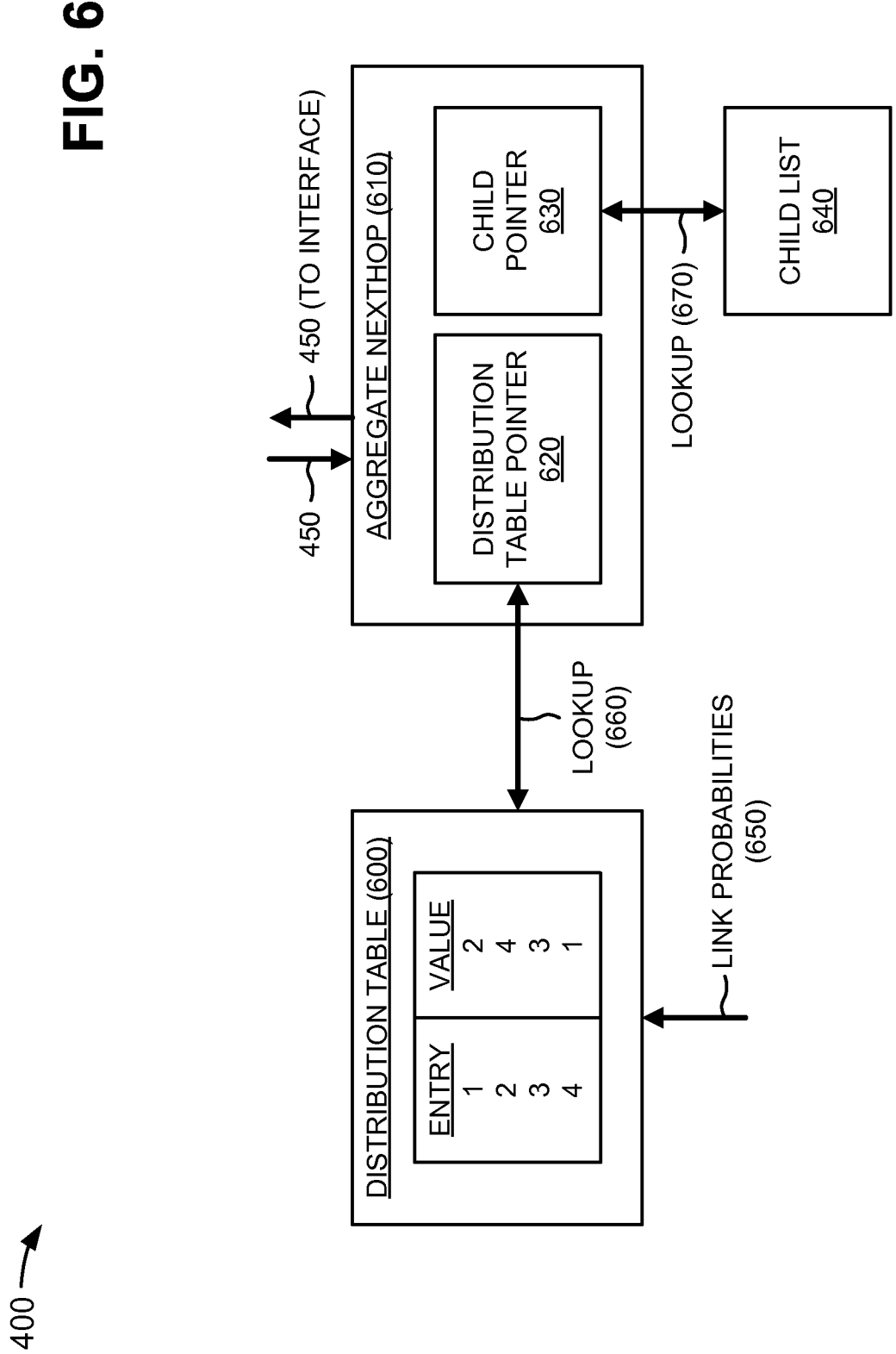
FIG. 6 is a diagram of additional exemplary functional components of the ASIC depicted in FIG. 4.

FIG. 6 is a diagram of additional exemplary functional components of ASIC 400. As shown, ASIC 400 may include a distribution table 600, an aggregate nexthop 610; a distribution table pointer 620 (e.g., associated with aggregate nexthop 610); a child pointer 630 (e.g., associated with aggregate nexthop 610); and a child list 640. In an exemplary implementation, the functionality described in connection with FIG. 6 may be performed by one or more of the components of ASIC 400 (FIG. 4). Although FIG. 6 shows a single aggregate nexthop 610, ASIC 400 may include more than one aggregate nexthop, such as hundreds, thousands, etc. of aggregate nexthops.

Distribution table 600 may include a table that is generated based on link probabilities 650. Link probabilities 650 may include probabilities of a packet leaving (e.g., network device 110) on child links of an aggregate Ethernet/SONET bundle associated with network device 110. For example, if an aggregate Ethernet/SONET bundle includes child links $i_1$, $i_2$, $i_3$, and $i_4$, distribution table 600 may distribute packets across the child links such that a probability of a packet leaving on a child link (e.g., $i_k$) is $p_k$ and $p_1+p_2+p_3+p_4=1$. If there are N entries in distribution table 600, then $p_1*N$ of entries may include a value of "1," $p_2*N$ of entries may include a value of "2," $p_3*N$ of entries may include a value of "3," $p_4*N$ of entries may include a value of "4," etc. As shown in FIG. 6, distribution table 600 may include entries (1, 2, 3, and 4) that correspond with values (2, 4, 3, and 1). In an exemplary implementation, the values in distribution table 600 may be scrambled or randomized. For example, if distribution table 600 is represented by D[1 . . . N], then D[k] may be "1" or "2" or "3" or "4." Rearrangement of the values in distribution table 600 may ensure that a particular child link is not overloaded.

Aggregate nexthop 610 may include address information for child nexthops associated with child links (e.g., of an aggregate Ethernet/SONET bundle) that a packet may traverse. As shown in FIG. 6, aggregate nexthop 610 may include distribution table pointer 620 and child pointer 630. Distribution table pointer 620 may point to distribution table 600, and may enable aggregate nexthop 610 to retrieve information contained in distribution table 600. Child pointer 630 may point to child list 640, and may enable aggregate nexthop 610 to retrieve information contained in child list 640.

Child list 640 may include a list of child nexthops associated with child links (e.g., of an aggregate Ethernet/SONET bundle) that a packet may traverse (e.g., via aggregate nexthop 610). The list of child nexthops provided in child list 640 may include information associated with the child nexthops, such as whether a child nexthop is a unicast nexthop or a multicast nexthop, information identifying a child link (e.g., an interface) associated with the child nexthop, etc.

If packet 450 is provided to aggregate nexthop 610, aggregate nexthop 610 may normalize a hash value associated with packet 450 to a value between "1" and N (e.g., the number of entries in distribution table 600). If the hash value of packet 450 is a particular value (e.g., "k"), distribution table pointer 620 of aggregate nexthop 610 may perform a lookup 660 of distribution table 600 (e.g., for entry "k"), and may retrieve a value (e.g., "D[k]") from distribution table 600 based on lookup 660. Child pointer 630 may perform a lookup 670 (e.g., based on the results of lookup 660) of child list 640, and may select a child nexthop (e.g., associated with value D[k]) from child list 640 based on lookup 670. Aggregate nexthop 610 may then send packet 450 via the determined child nexthop.

In such an arrangement, for example, a probability that a first child nexthop is selected may be $p_1$, and there may be $p_1*N$ entries of distribution table 600 that include a value (e.g., "1") associated with the first child nexthop. Furthermore, the arrangement depicted in FIG. 6 may provide a weighted load balancing of packets (e.g., packet 450), and a number of memory references needed to select a child nexthop may be constant and independent of a number of child links in an aggregate Ethernet/SONET bundle.

Although FIG. 6 shows exemplary functional components of ASIC 400, in other implementations, ASIC 400 may contain fewer functional components, different functional components, differently arranged functional components, or additional functional components than depicted in FIG. 6. Alternatively, or additionally, one or more functional components of ASIC 400 may perform one or more other tasks described as being performed by one or more other functional components of ASIC 400.

Exemplary Processes

Figure 7:
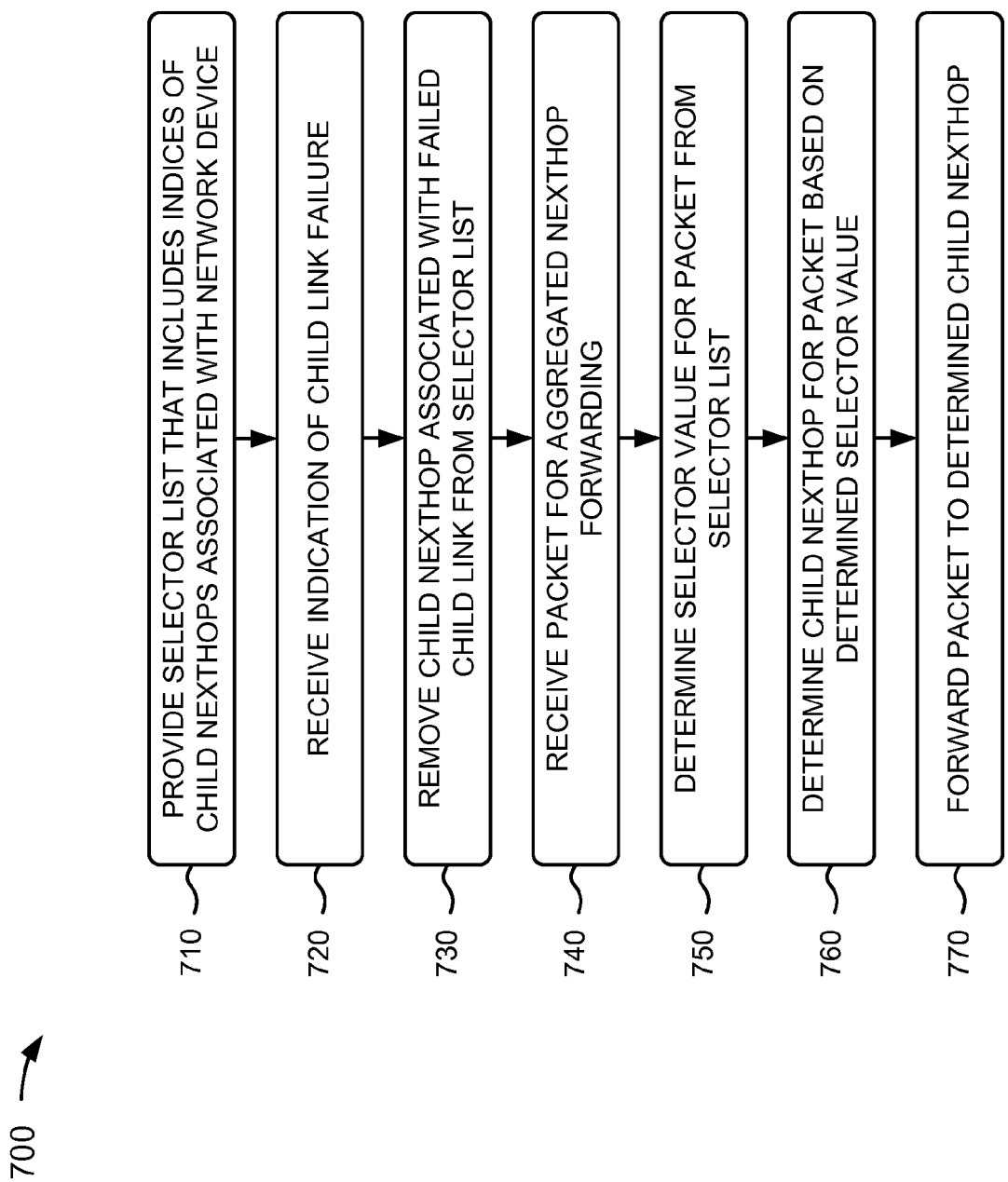
FIG. 7 is a flow chart of an exemplary process for providing fast convergence on child link failures of aggregate Ethernet/SONET bundles according to implementations described herein.

FIG. 7 is a flow chart of an exemplary process 700 for providing fast convergence on child link failures of aggregate Ethernet/SONET bundles according to implementations described herein. In one implementation, process 700 may be performed by PFE 310/330 (FIG. 3) or one or more components of PFE 310/330 (FIG. 4). In another implementation, some or all of process 700 may be performed by network device 110.

As illustrated in FIG. 7, process 700 may include providing a selector list that includes indices of child nexthops associated with a network device (block 710), receiving an indication of a child link failure (block 720), and removing a child nexthop associated with the failed child link from the selector list (block 730). For example, in implementations described above in connection with FIG. 5, selector list 540 of PFE 310/330 may include a table of indices of child nexthops associated with child links (e.g., of an aggregate Ethernet/SONET bundle) that a packet may traverse (e.g., via aggregate nexthop 500-1, aggregate nexthop 500-2, or other aggregate nexthops associated with ASIC 400). In one example, selector list 540 may include a table of up to two-hundred and fifty-six (256) entries that may be randomly arranged. If a child link of an aggregate Ethernet/SONET bundle fails, selector list 540 may receive update 590 based on the child link failure. Update 590 may remove the index of the child nexthop associated with the failed child link from selector list 540.

As further shown in FIG. 7, process 700 may include receiving a packet for aggregated nexthop forwarding (block 740), and determining a selector value for the packet from the selector list (block 750). For example, in implementations described above in connection with FIG. 5, if packet 450 is provided to aggregate nexthop 500-1, selector pointer 520-1 of aggregate nexthop 500-1 may perform lookup 550 of selector list 540. Selector pointer 520-1 may retrieve a value from selector list 540 based on lookup 550. In one example, selector pointer 520-1 may retrieve a "0" from selector list based on lookup 550. In another example, selector pointer 520-1 may retrieve a "1" from selector list based on lookup 550.

Returning to FIG. 7, process 700 may include determining a child nexthop for the packet based on the determined selector value (block 760), and forwarding the packet to the determined child nexthop (block 770). For example, in implementations described above in connection with FIG. 5, if selector pointer 520-1 retrieves a "0" from selector list 540 based on lookup 550, child pointer 510-1 may perform lookup 560 (e.g., based on the results of lookup 550) of child list 530-1, and may retrieve child nexthop U1 (e.g., the first interface) from child list 530-1 based on lookup 560. Aggregate nexthop 500-1 may then send packet 450 via child nexthop U1 (e.g., the first interface). If selector pointer 520-1 retrieves a "1" from selector list 540 based on lookup 550, child pointer 510-1 may perform lookup 560 (e.g., based on the results of lookup 550) of child list 530-1, and may retrieve child nexthop U2 (e.g., the second interface) from child list 530-1 based on lookup 560. Aggregate nexthop 500-1 may then send packet 450 via child nexthop U2 (e.g., the second interface).

FIG. 8 is a flow chart of an exemplary process 800 for providing a weighted load balancing scheme for aggregate Ethernet/SONET bundles according to implementations described herein. In one implementation, process 800 may be performed by PFE 310/330 (FIG. 3) or one or more components of PFE 310/330 (FIG. 4). In another implementation, some or all of process 800 may be performed by network device 110.

As illustrated in FIG. 8, process 800 may include receiving probabilities of child links associated with the network device, where each probability indicates a probability of a packet exiting the network device on a child link (block 810), creating a distribution table based on the probabilities of the child links (block 820), and scrambling values provided in the distribution table (block 830). For example, in implementations described above in connection with FIG. 6, distribution table 600 may include a table that is generated based on link probabilities 650. Link probabilities 650 may include probabilities of a packet leaving (e.g., network device 110) on child links of an aggregate Ethernet/SONET bundle associated with network device 110. In one example, if an aggregate Ethernet/SONET bundle includes child links $i_1$, $i_2$, $i_3$, and $i_4$, distribution table 600 may distribute packets across the child links such that a probability of a packet leaving on a child link (e.g., $i_k$) is $p_k$ and $p_1+p_2+p_3+p_4=1$. If there are N entries in distribution table 600, then $p_1*N$ of entries may include a value of "1," $p_2*N$ of entries may include a value of "2," $p_3*N$ of entries may include a value of "3," $p_4*N$ of entries may include a value of "4," etc. In one example, the values in distribution table 600 may be scrambled or randomized.

As further shown in FIG. 8, process 800 may include receiving a packet for aggregated next hop forwarding (block 840), determining a distribution table value for the packet from the distribution table (block 850), selecting a child nexthop for the packet based on the determined distribution table value (block 860), and forwarding the packet to the determined child nexthop (block 870). For example, in implementations described above in connection with FIG. 6, if packet 450 is provided to aggregate nexthop 610, aggregate nexthop 610 may normalize a hash value associated with packet 450 to a value between "1" and N. If the hash value of packet 450 is a particular value (e.g., "k"), distribution table pointer 620 of aggregate nexthop 610 may perform lookup 660 of distribution table 600 (e.g., for entry "k"), and may retrieve a value (e.g., "D[k]") from distribution table 600 based on lookup 660. Child pointer 630 may perform a lookup 670 (e.g., based on the results of lookup 660) of child list 640, and may select a child nexthop (e.g., associated with value D[k]) from child list 640 based on lookup 670. Aggregate nexthop 610 may then send packet 450 via the determined child nexthop.

CONCLUSION

Implementations described herein may provide systems and/or methods that may provide a selector list that includes indices of child nexthops of an aggregate Ethernet/SONET child link bundle associated with a network device. Aggregate nexthops associated with the network device may include a pointer to the selector list, which may act as an indirection. If a child link of the aggregate Ethernet/SONET bundle fails, the systems and/or methods may remove a child nexthop index associated with the failed child link from the selector list. Such an arrangement may result in a single operation that may be utilized immediately by all aggregate nexthops using the selector list. This may provide fast convergence of the network device during child link failures, regardless of a number of aggregate nexthops as well as a number of routes which use the aggregate nexthops. Furthermore, less traffic may be lost by customers using the aggregate nexthops, and traffic may be quickly load balanced to other available child links within the aggregate Ethernet/SONET bundle. Finally, systems and/or methods described herein may be implemented while maintaining a line-rate packet forwarding performance of a network device.

In an exemplary implementation, the systems and/or methods may provide a distribution table based on probabilities of a packet leaving on a child link of an aggregate Ethernet/SONET child link bundle, and may randomly rearrange entries (e.g., child nexthops) in the distribution table. The systems and/or methods may receive a packet, and may select a child nexthop for the packet from the distribution table. The systems and/or methods may determine a child link based on the selected child nexthop, and may forward the packet to the determined child link of the aggregate Ethernet/SONET child link bundle. Such an arrangement may load balance packets across multiple links with a configurable probability for selection of a link.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 7 and 8, the order of the blocks may be modified in other implementations. Further, non-dependent blocks may be performed in parallel.

It will be apparent that exemplary aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by a network device, the method comprising:
   receiving, by the network device, probabilities associated with links associated with the network device,
      each of the links being associated with a corresponding nexthop, and
      each of the probabilities indicating a probability of a packet exiting the network device on a link of the links;
   creating, by the network device, a distribution table based on the probabilities associated with the links;
   rearranging, by the network device, values that are associated with the probabilities and are provided in the distribution table;
   performing, by the network device and using information associated with the packet, a lookup in the distribution table to retrieve a particular value of the values;
   selecting, by the network device, a particular nexthop based on the particular value; and
   forwarding, by the network device, the packet to the particular nexthop.

2. The method of claim 1, where the probabilities associated with the links include probabilities of the packet leaving on links of an aggregate Ethernet/SONET bundle associated with the network device.

3. The method of claim 1, where the distribution table is provided by an application-specific integrated circuit (ASIC) of a packet forwarding engine (PFE) provided in the network device.

4. The method of claim 1, where rearranging the values includes rearranging the values to create a randomized list of values.

5. The method of claim 1, where the information associated with the packet includes a hash value associated with the packet.

6. The method of claim 5, where performing the lookup in the distribution table includes:
   normalizing the hash value associated with the packet; and
   using the normalized hash value to perform the lookup.

7. A network device comprising:
   a memory to store:
      a distribution table comprising values corresponding to probabilities associated with links associated with the network device,
         each of the links being associated with a corresponding nexthop, and
         each of the probabilities indicating a probability of a packet exiting the network device on a link of the links, and
      a list of nexthops associated with the links; and
   a processor to:
      receive the packet;
      perform, using information associated with the packet, a lookup in the distribution table to retrieve a particular value of the values;
      select a particular nexthop, of the nexthops, based on the particular value; and
      forward, the packet to the particular nexthop.

8. The network device of claim 7, where the links are of an aggregate Ethernet/SONET bundle associated with the network device.

9. The network device of claim 7,
where the memory is further to store:
    a list of address information for the nexthops associated with the links;
where, when forwarding the packet to the nexthop, the processor is further to:
    forward, using the list of address information, the packet to the nexthop.

10. The network device of claim 7, where the information associated with the packet includes a hash value.

11. The network device of claim 10, where, when performing the lookup, the processor is further to:
    normalize the hash value, and
    perform the lookup using the normalized hash value.

12. The network device of claim 7, where the distribution table is provided by an application-specific integrated circuit (ASIC) of a packet forwarding engine (PFE) provided in the network device.

13. The network device of claim 7, where the values in the distribution table are randomized.

14. A network device comprising:
a processor to:
    receive probabilities associated with links associated with the network device,
        each of the links being associated with a corresponding nexthop, and
        each of the probabilities indicating a probability of a packet exiting the network device on a link of the links;
    create a distribution table based on the probabilities associated with the links;
    rearrange values that are associated with the probabilities and that are provided in the distribution table;
    perform, using information associated with the packet, a lookup in the distribution table to retrieve a particular value of the values;
    select a particular nexthop based on the particular value; and
    forward the packet to the particular nexthop.

15. The network device of claim 14, where the distribution table is provided by an application-specific integrated circuit (ASIC) of a packet forwarding engine (PFE) provided in the network device.

16. The network device of claim 14, where the links are an aggregated bundle of links associated with the network device.

17. The network device of claim 16, where the aggregated bundle of links comprises one of:
    an aggregated Ethernet bundle of links, or
    an aggregated synchronous optical networking (SONET) bundle of links.

18. The network device of claim 14, where the information associated with the packet includes a hash value associated with the packet.

19. The network device of claim 18, where, when performing the lookup in the distribution table, the processor is further to:
    normalize the hash value associated with the packet; and
    use the normalized hash value to perform the lookup.

20. The network device of claim 14, where the values in the distribution table are randomized.

* * * * *